(12) United States Patent
McClellan

(10) Patent No.: US 7,307,649 B2
(45) Date of Patent: Dec. 11, 2007

(54) OPTICAL DISC NON-CARTESIAN COORDINATE SYSTEM

(75) Inventor: Paul J. McClellan, Bend, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 846 days.

(21) Appl. No.: 10/317,894

(22) Filed: Dec. 12, 2002

(65) Prior Publication Data

US 2004/0114499 A1   Jun. 17, 2004

(51) Int. Cl.
*B41J 2/435* (2006.01)

(52) U.S. Cl. .................................................. 347/224

(58) Field of Classification Search ........ 347/224–225, 347/229, 12; 369/272, 13.11, 30.01, 30.33, 369/111, 124.07, 124.08, 13.01, 27.01, 28.01, 369/275.3; 422/58
See application file for complete search history.

(56) References Cited

U.S. PATENT DOCUMENTS

| | | | |
|---|---|---|---|
| 4,967,286 A | 10/1990 | Nomula et al. | 358/342 |
| 5,317,337 A | 5/1994 | Ewaldt | 346/1.1 |
| 5,781,221 A | 7/1998 | Wen et al. | 347/232 |
| 6,019,151 A | 2/2000 | Wen et al. | 156/387 |
| 6,264,295 B1 | 7/2001 | Bradshaw et al. | 347/2 |
| 6,310,691 B2 | 10/2001 | Cariffe | |
| 6,386,667 B1 * | 5/2002 | Cariffe | 347/12 |
| 6,532,034 B2 * | 3/2003 | Hirotsune et al. | 347/229 |
| 2002/0126617 A1 * | 9/2002 | Emberty et al. | 369/272 |
| 2002/0150503 A1 * | 10/2002 | Tanaka et al. | 422/58 |

FOREIGN PATENT DOCUMENTS

| | | |
|---|---|---|
| EP | 1422697 A | 5/2004 |
| JP | 2002-203321 | 7/2002 |
| WO | WO00/21078 A | 4/2000 |

OTHER PUBLICATIONS

European Search Report for Application No. EP03257778, based on U.S. Appl. No. 10/317,894, filed Dec. 12, 2002. Report Issued Nov. 25, 2005, not to be published.

* cited by examiner

*Primary Examiner*—Hai Pham

(57) ABSTRACT

A method of one embodiment of the invention is disclosed that generates a non-Cartesian coordinate system for an optical disc. One or more uniform distances, as well as a plurality of positions on the optical disc, are selected. Each position is separated from adjacent positions by one of the uniform distances, and has a location on the optical disc specifiable to a same degree of precision by at least one integral coordinate.

31 Claims, 6 Drawing Sheets

OPTICAL DISC NON-CARTESIAN COORDINATE SYSTEM

BACKGROUND

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used, but this is a laborious process: the labels must be carefully aligned on the discs, and so on. Special-purpose printers that print directly on the discs may be used, but such printers are fairly expensive. In the patent application entitled "Integrated CD/DVD Recording and Label" filed on Oct. 11, 2001, and assigned Ser. No. 09/976,877, a solution to these difficulties is described, in which a laser is used to label optical discs.

When optically writing on either the optically writable data or label side of an optical disc, a coordinate system is used to specify positions on the optical disc. Most common is a polar coordinate system, in which two coordinates are used to specify a given position: a radius coordinate, and an angular coordinate. However, such a coordinate system does not map directly to the geometry of the optical disc. That is, different positions on the optical disc may need different degrees of precision among the coordinates to particularly specify the positions. For instance, as the radius coordinate increases, increasingly precise angular coordinates are usually needed to specify uniformly spaced positions on the optical disc, potentially making writing to the optical disc difficult. Previous attempts to potentially solve this problem have utilized Cartesian coordinate systems. However, mapping the geometry of an optical disc to a rectangular, x-y coordinate system can require significant reworking of optical disc devices, making this solution less than desirable.

SUMMARY OF THE INVENTION

A method of one embodiment of the invention generates a non-Cartesian coordinate system for an optical disc. One or more uniform distances, as well as a plurality of positions on the optical disc, are selected. Each position is separated from adjacent positions by one of the uniform distances, and has a location on the optical disc specifiable to a same degree of precision by at least one integral coordinate.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Optical Disc and Optical Disc Coordinate System

Figure 1:
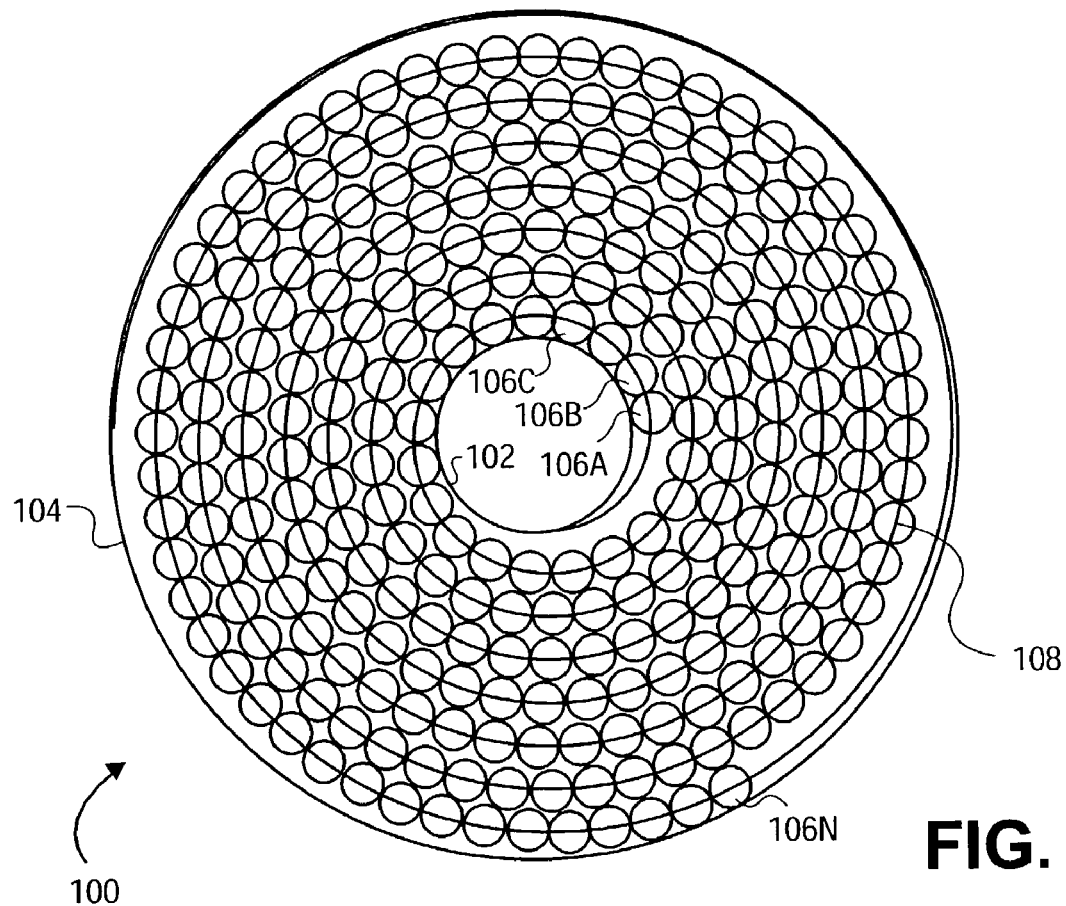
FIG. 1 is a diagram of an optical disc depicting an optical disc coordinate system, according to an embodiment of the invention.

FIG. 1 shows a coordinate system for an optical disc 100, according to an embodiment of the invention. The optical disc 100 may be a compact disc (CD), a digital versatile disc (DVD), or another type of optical disc. The optical disc 100 preferably has an optically writable data surface. In one embodiment, the optical disc 100 also has an optically writable label surface. Such an optically writable label surface is particularly disclosed in the patent application entitled "Integrated CD/DVD Recording and Label" filed on Oct. 11, 2001, and assigned Ser. No. 09/976,877.

The optical disc 100 has a number of positions 106A, 106B, 106C, . . . , 106N, collectively referred to as the positions 106. The positions 106 form a spiral path 108 from an inside diameter 102 of the optical disc 100 to an outside diameter 104 of the optical disc 100. Each of the positions 106 is a substantially equally sized position where an optical beam can achieve an optically writable marking, such as an optically writable data marking, an optically writable label marking, and so on. A marking on a given position preferably fills the entirety of the position. As depicted in FIG. 1, the positions 106, and hence markings on the positions 106, are circular in nature. However, in other embodiments of the invention, they may be other than circular, such as rectangular, elliptical, and so on, and may overlap so as to completely fill the marking surface and thereby achieve greater labeling optical density.

Furthermore, each of the positions 106 is separated from a previously adjacent position and a successively adjacent position by a substantially uniform distance. This is more clearly depicted in FIG. 2, which shows the positions 106A, 106B, and 106C on the spiral path 108 in more detail, according to an embodiment of the invention. The positions 106A, 106B, and 106C have center points 202A, 202B, and 202C. The distance between the positions 106A and 106B is represented as the distance between their center points 202A and 202B, respectively. Likewise, the distance between the positions 106B and 106C is represented as the distance between their centers points 202B and 202C, respectively. Thus, the distance between the positions 106A and 106B is the distance 204, whereas the distance between the positions 106B and 106C is the distance 206.

The distances 204 and 206 are equal to one another, since the position 106B is separated from the previously adjacent position 106A and from the successively adjacent position 106C by a uniform distance. In one embodiment, this uniform distance is equal to the diameter of the marking that an optical beam is able to write on any of the positions 106, including the position 106B. That is, markings on adjacent of the positions 106 touch one another, but do not overlap one another. A marking is thus able to fill the entirety of a given position. In another embodiment, however, greater labeling optical density is achieved by having the markings overlap, such that the markings are greater in size than the positions 106. Furthermore, it is noted that whereas a single uniform distance has been described as separating adjacent of the positions 106, there may be more than one uniform distance. For instance, a first uniform distance may separate adjacent of the positions 106 along the spiral path 108, whereas a second uniform distance may separate adjacent of the positions 106 that are radially adjacent to one another, and not adjacent to one another on the spiral path 108.

Figure 2:
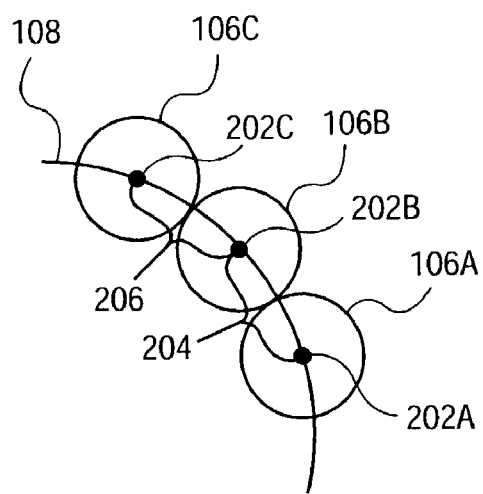
FIG. 2 is a diagram of a number of the positions specified by the optical disc coordinate system of FIG. 1 in more detail, according to an embodiment of the invention.

The optical disc 100 of the embodiment of FIG. 1 having the spiral path 108, as a portion of which is shown in more detail in FIG. 2, is able to have each of its positions 106 specifiable to the same degree of precision by one integral coordinate. The integral coordinate specifies which of the positions 106 is being referred to, from a lowest value indicating the position 106A to a highest value indicating the position 106N. Thus, a single integral coordinate is able to specify any of the positions 106 on the spiral path 108. For example, the position 106A may be indicated by an integral coordinate of zero, the position 106B may be indicated by an integral coordinate of one, the position 106C may be indicated by an integral coordinate of two, and so on, until the position 106N is indicated by an integral coordinate with a maximum value.

Furthermore, the integral coordinate specifies the positions 106 to the same degree of precision in that uniform positional density is achieved without having to increase the accuracy or precision of the coordinate based on the part of the optical disc 100 that is being referenced. The positions 106 are of uniform size and uniformly cover the optical disc 100, such that they have a uniform density. Advancing the integral coordinate by one specifies the next position within the positions 106, without any further precision or accuracy on the part of the coordinate system depicted in FIG. 1. That is, no matter where the position that is currently being referenced by the integral coordinate lies on the optical disc 100, incrementing the coordinate by one accurately and precisely specifies the next adjacent position on the optical disc 100, such that uniform positional density is achieved.

This is more descriptively clear in relation to, and contrasts favorably with, a polar coordinate system in which as the radius coordinate increases, the polar coordinate must be specified with increasing precision to adequately specify all the positions on an optical disc such that uniform density can be achieved. For instance, at a smaller radius, incrementing the polar coordinate by single degrees may be sufficient to specify all the positions at this radius with uniform density. However, at a larger radius, incrementing the polar coordinate by single degrees results in larger gaps between identically sized positions. To achieve uniform density with uniformly sized positions, the polar coordinate would have to be incremented by smaller values, such as halves, quarters, or tenths of a degree, as the radius coordinate increases. By comparison, the coordinate system of FIG. 1 simply has to have its single coordinate incremented by one to specify the next position of the positions 106, regardless of where the position is on the optical disc 100, to achieve uniform density with uniformly sized positions.

Furthermore, the optical disc coordinate system of embodiments of the invention is non-Cartesian and non-rectangular in nature, such that the coordinates employed are non-Cartesian and non-rectangular. A Cartesian, coordinate system, which is also referred to as a rectangular coordinate system, specifies positions on an optical disc, or other two-dimensional plane, using two orthogonal coordinates, a first linear coordinate along an x-axis, and a second linear coordinate along a y-axis perpendicular to the x-axis. However, Cartesian coordinate systems do not map well to the planar geometry of an optical disc, which is circular and disc-like in nature. They thus may require major reworking of existing optical disc devices to map such Cartesian and rectangular coordinates to the optical disc geometry.

Figure 3A:
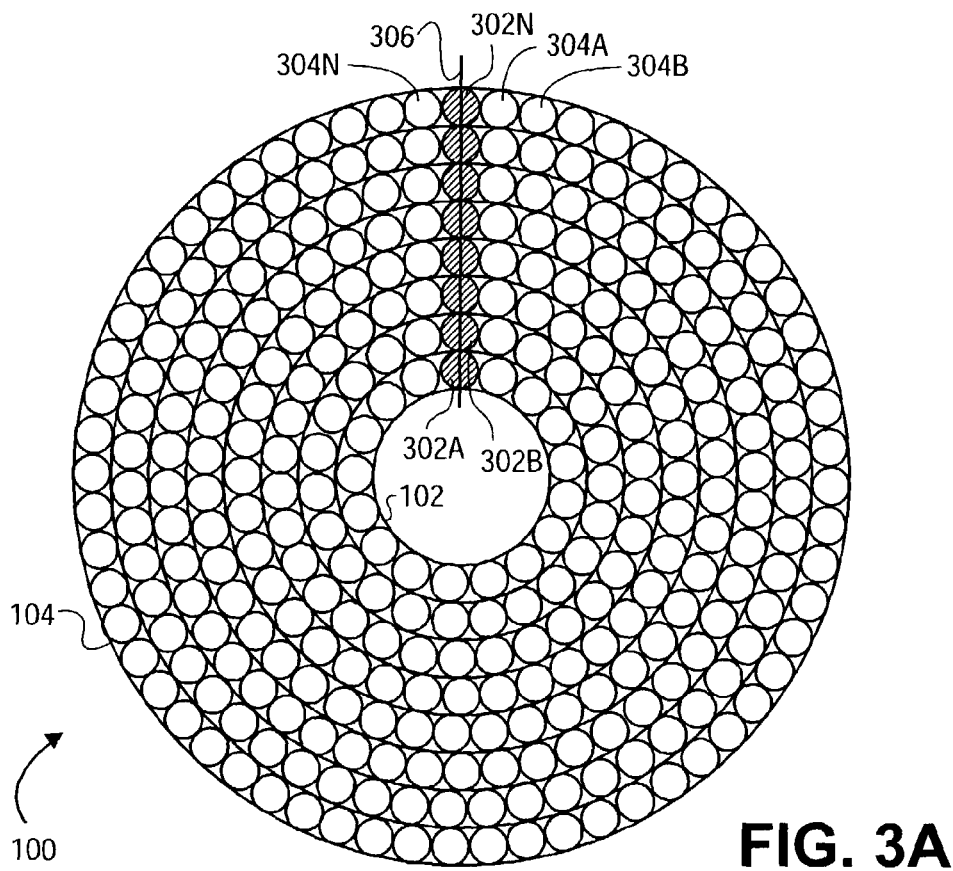
FIGS. 3A and 3B are diagrams of an optical disc depicting another optical disc coordinate system, according to an embodiment of the invention.
Figure 3B:
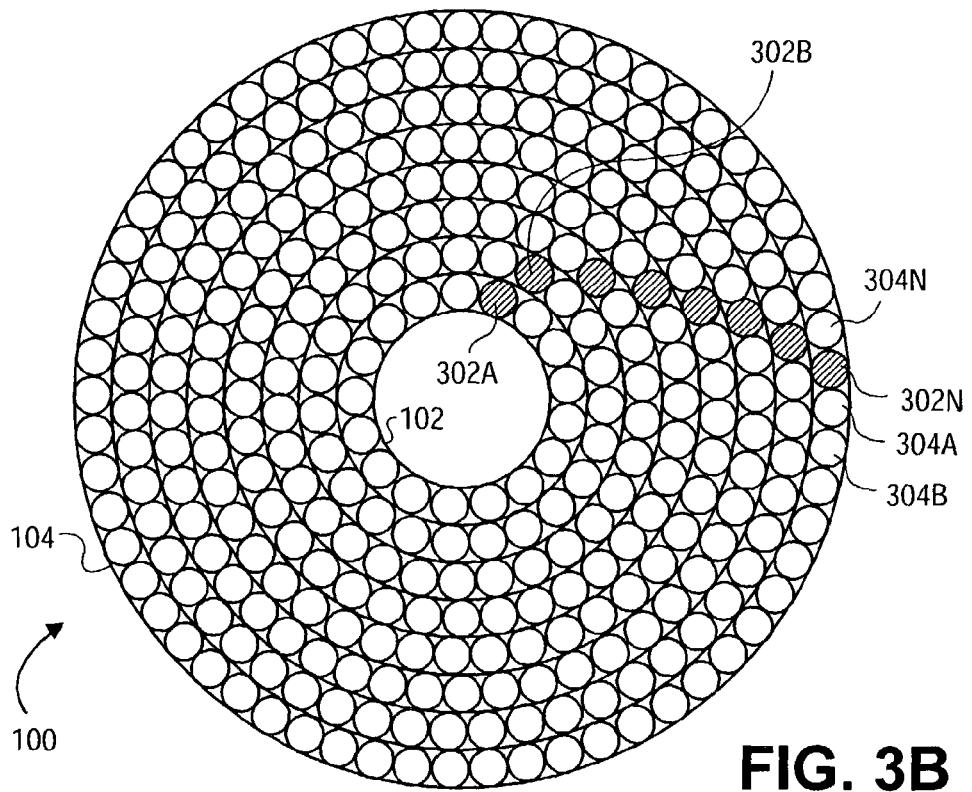

FIGS. 3A and 3B show another coordinate system for the optical disc 100, according to an embodiment of the invention. The optical disc 100 has a number of circular tracks denoted by the shaded positions 302A, 302B, 302C, . . . , 302N, collectively referred to as the positions 302. Each of these tracks is concentric with the inside diameter 102 and the outside diameter 104 of the optical disc 100. Further, each of the tracks has a number of positions in addition to the positions 302. For example, the track denoted by the shaded position 302N also has the positions 304A, 304B, . . . , 304N, collectively referred to as the positions 304. As before, each of the positions on each of the tracks is a substantially equally sized position at which an optical beam can achieve an optically writable marking. A marking on a given position preferably fills the entirety of the position. As depicted in FIGS. 3A, and 3B, the positions, and hence markings on the position, are circular in nature, but may have shapes other than circular shapes in other embodiments of the invention.

Each of the positions on each of the tracks denoted by the shaded positions 302 is separated from a previously adjacent position and a successively adjacent position by a substantially uniform distance. Furthermore, each of the tracks is separated from a previously adjacent track and a successively adjacent track by a substantially uniform distance. This is more clearly depicted in FIG. 4, which shows the portions of the tracks indicated by the shaded positions 302A, 302B, and 302C in more detail, according to an embodiment of the invention. The shaded positions 302A, 302B, and 302C have center points 402A, 402B, and 402C. The distance between the positions 302A and 302B is represented as the distance 404 between their center points 402A and 402B, respectively, whereas the distance between the positions 302B and 302C is represented as the distance 406 between their center points 402B and 402C, respectively. The distances 404 and 406 are equal to one another, since the track denoted by the position 302B is separated from the previously adjacent track denoted by the position 302A and from the successively adjacent track denoted by the position 302C by a uniform distance.

The track denoted by the shaded position 302B includes the positions 408A and 408B having center points 409A and 409B, respectively. The distance between the position 408A and the previously adjacent position 302B is denoted by the distance 410 between the center points 409A and 402B of these positions, whereas the distance between the position 408A and the successively adjacent position 408B is denoted by the distance 412 between the center points 409A and 409B of these positions. The distances 410 and 412 are equal to one another, since the position 408A is separated from the previously adjacent position 302B and from the successively adjacent position 408B by the same uniform distance that separates the tracks. In an alternate embodiment, the direction of the markings is reversed, such that the position 408A is separated from the previously adjacent position 409B and the successively adjacent position 302B. Furthermore, in one embodiment, this uniform distance is equal to the diameter of the markings that an optical beam is able to write on any of the positions, including the position 408A. Thus, as before, markings on adjacent positions touch one another, but do not overlap one another, and therefore completely fill the entirety of the positions. However, in another embodiment, the markings on adjacent positions overlap one another, to achieve greater labeling optical density.

The distances 410 and 412 may be equal to or different than the distances 404 and 406. That is, the distances 410 and 412 may represent a first uniform distance that is the same or different than a second uniform distance that the distances 404 and 406 represent. The first uniform distance to which the distances 410 and 412 are equal is the distance between adjacent positions along a same track. By comparison, the second uniform distance to which the distances 404 and 406 are equal is the distance between adjacent positions along adjacent tracks, or radially adjacent positions. The first uniform distance may thus be the same distance or a different distance as the second uniform distance.

Figure 4:
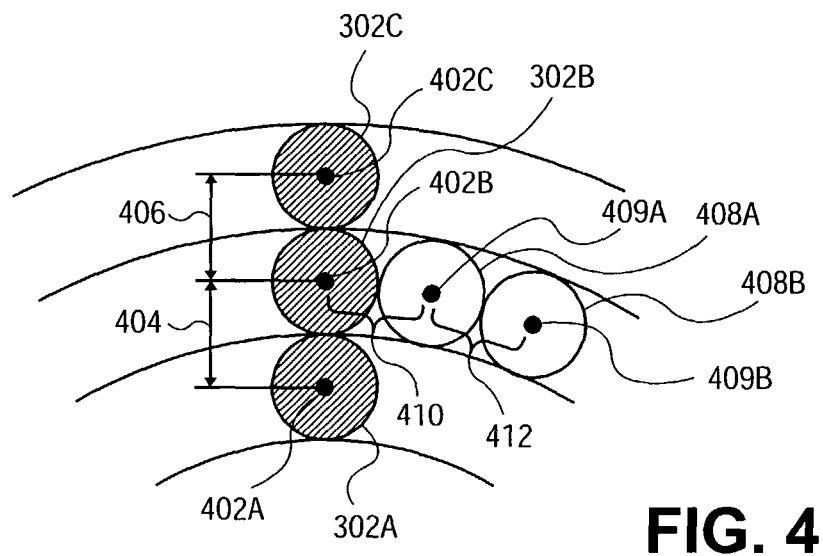
FIG. 4 is a diagram of a number of the positions and a number of the tracks specified by the coordinate system of FIGS. 3A and 3B in more detail, according to an embodiment of the invention.

The optical disc 100 of the embodiment of FIGS. 3A and 3B having tracks denoted by the shaded positions 302, as a portion of which is shown in more detail in FIG. 4, is able to have each of its positions specifiable to the same degree of precision by two integral coordinates. A first integral coordinate specifies the track of a given position, from a lowest value indicating the track corresponding to the position 302A to a highest value indicating the track corresponding to the position 302N. A second integral coordinate specifies the given position along the track. For example, for positions along the track denoted by the shaded position 302N, a lowest value indicates the position 302N, a next lowest value indicates the position 304A, and a highest value indicates the position 304N.

Thus, the shaded position of a given track that denotes the track is preferably has the lowest value indicated by the second coordinate for positions on the track. The difference between the embodiments of FIGS. 3A and 3B is that in FIG. 3A, the shaded positions 302 all lie on a straight line 306, whereas in FIG. 3B, the shaded positions 302 are offset from one another, and do not lie on a straight line. The embodiment of FIG. 3B can be employed in lieu of the embodiment of FIG. 3A to render less visible any systematic marking effects that may result from the optical beam when it moves to and/or marks the first position on a given track. In the embodiment of FIG. 3A, such systematic effects may be more pronounced because the first positions 304 on the tracks denoted thereby all lie on the same line 306, whereas the effects may be reduced in the embodiment of FIG. 3B because the positions 304 are shifted relative to one another. That is, embodiments of the invention are not restricted to having the tracks denoted by the positions 304 start at the same angular position. Thus, the first positions 304 in FIG. 3A are collinear to one another, whereas they are non-collinear to one another in FIG. 3B.

The two integral coordinates specify the positions in the embodiments of FIGS. 3A and 3B to the same degree of precision because uniform positional density is achieved without having to increase the accuracy or precision of the coordinates based on the part or track of the optical disc 100 that is being referenced. The positions are of uniform size and uniformly cover the optical disc 100, such that they have a uniform density. Advancing the first integral coordinate by one specifies the next track within the tracks denoted by the shaded positions 302, without any further precision or accuracy on the part of the coordinate system depicted in FIGS. 3A and 3B.

Similarly, advancing the second integral coordinate by one specifies the next position within a given one of the tracks denoted by the shaded positions 302, without any further precision or accuracy on the part of this coordinate system. That is, no matter which track the first integral coordinate specifies, incrementing the second integral coordinate by one accurately and precisely specifies the next adjacent position on this track, such that uniform positional density is achieved.

Figure 5:
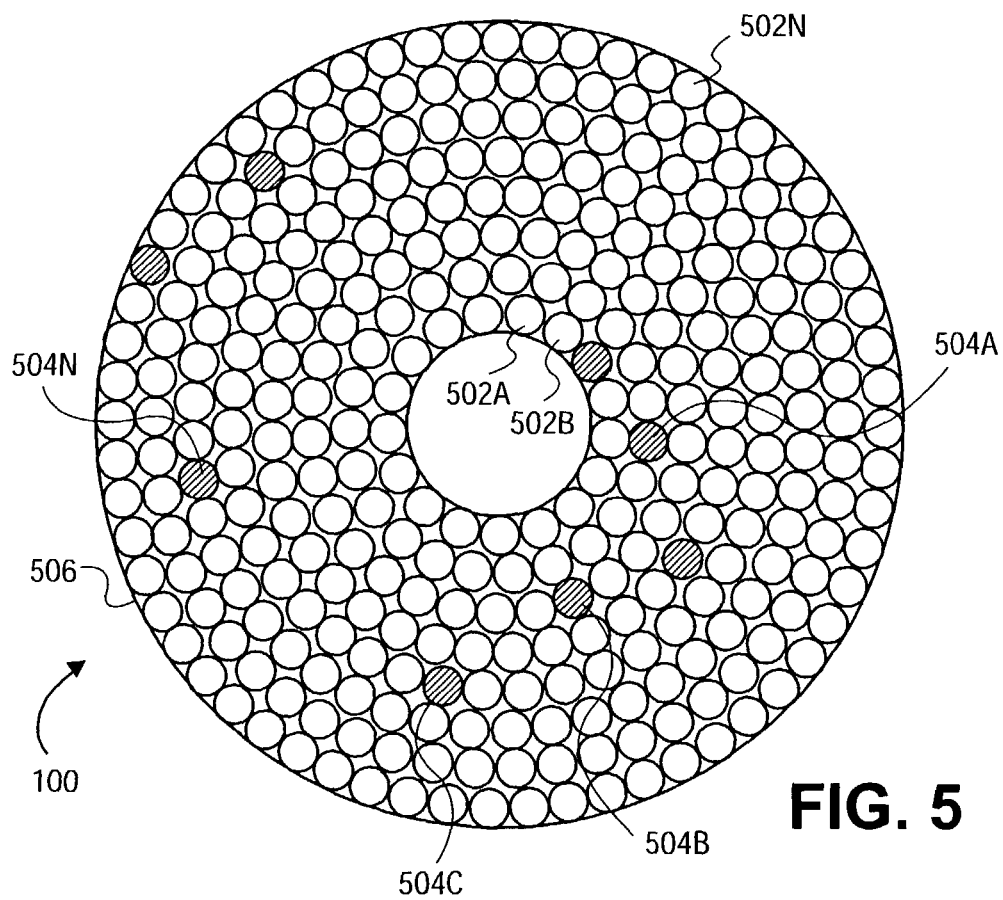
FIG. 5 is a diagram of a simplified example of an optical disc having a number of markings on a selected number of positions specified by a coordinate system, such as the coordinate system of FIG. 1 or the coordinate system of FIGS. 3A and 3B, according to an embodiment of the invention.

FIG. 5 shows a simplified example of the optical disc 100 having a number of markings 504 on a selected number of positions 502, according to an embodiment of the invention. The positions 502 include the positions 502A, 502B, . . . , 502N. The positions 502 each have a location on the optical disc 100 specifiable to the same degree of precision by at least one integral coordinate. For instance, the positions 502 each may be specified by one coordinate in conjunction with the integral coordinate system of the embodiment of FIG. 1, or each may be specified by two coordinates in conjunction with the integral coordinate system of the embodiment of FIGS. 3A-3B. In one embodiment, the positions 502 may be slightly different, depending on the coordinate system utilized. That is, the spiral track and the concentric circular tracks may not map to exactly the same set of the positions 502. Each of the positions 502 is separated from adjacent positions by a uniform distance, preferably equal to the diameter of an optically writable marking that is able to fill the entirety of the position. The surface of the optical disc 100 that is visible in FIG. 5 is denoted as the surface 506, and can be an optically writable label surface in one embodiment of the invention. The markings 504 include the markings 504A, 504B, . . . , 504N that are written on corresponding of the positions 502 on the surface 506 of the optical disc 100.

Figure 6:
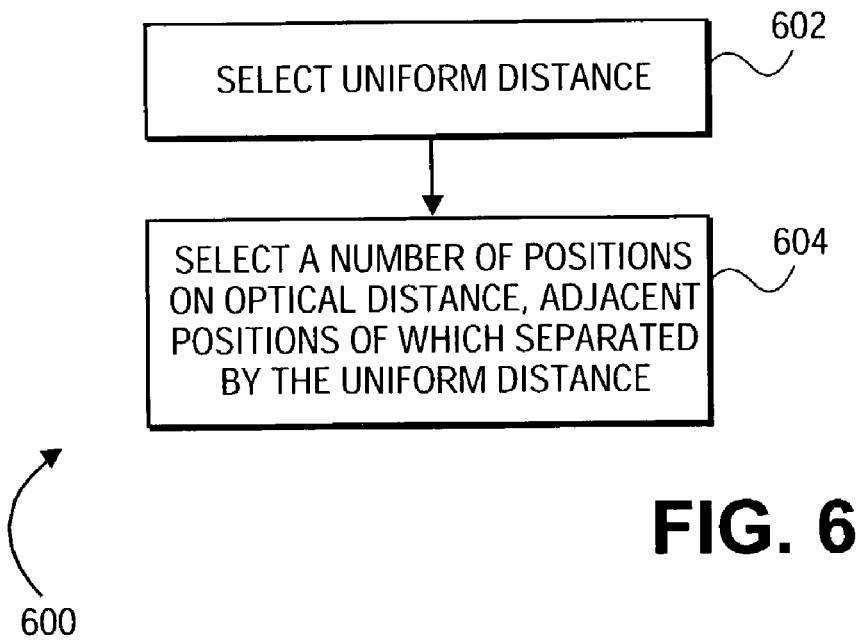
FIG. 6 is a flowchart of a method for generating a coordinate system for an optical disc, such as the coordinate system of FIG. 1 or the coordinate system of FIGS. 3A and 3B, according to an embodiment of the invention.

FIG. 6 shows a method 600 for generating a coordinate system for the optical disc 100, according to an embodiment of the invention. The coordinate system may be that of the embodiment of FIG. 1, that of the embodiment of FIGS.

3A-3B, or another coordinate system. First, a uniform distance is selected (602), preferably as the diameter of each of the markings that an optical beam is able to write on the optical disc 100. In an embodiment of the invention where radially adjacent positions are separated by a different uniform distance than adjacent positions along a spiral path or along the same track, two or more uniform distances may be selected. Next, a number of positions on the optical disc are selected (604), where each position is separated from adjacent positions by the uniform distance, and has a location on the optical disc 100 specifiable to the same degree of precision by at least one integral coordinate. For instance, the positions may be selected and their locations specified in accordance with the spiral-oriented coordinate system of the embodiment of FIG. 1, the track-oriented coordinate system of the embodiment of FIGS. 3A-3B, and so on.

Figure 7:
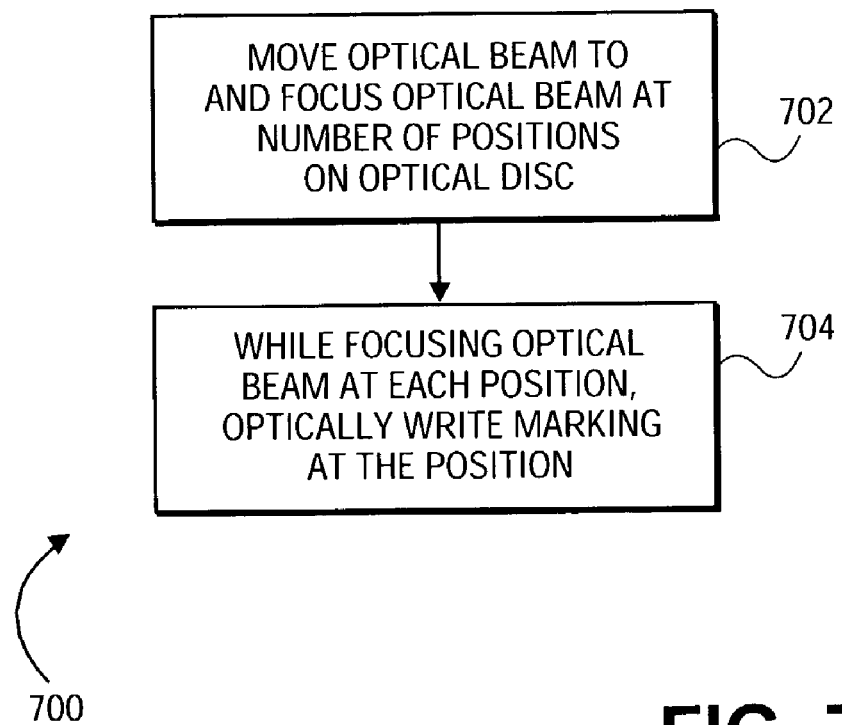
FIG. 7 is a flowchart of a method for forming markings on an optical disc, in accordance with a coordinate system such as that of FIG. 1 or that of FIGS. 3A and 3B, according to an embodiment of the invention.

FIG. 7 shows a method 700 for forming markings on an optical disc, according to an embodiment of the invention. The optical disc 100 of FIG. 5, for example, may have its markings formed by performing the method 700. An optical beam is moved to and focused at a number of positions, but not necessarily all of the positions, on the optical disc 100 (702). The optical beam may be incident to an optically writable label surface of the disc 100, such as the surface 506 of FIG. 5. The positions on the optical disc 100 are in accordance with a coordinate system, such as the spiral-oriented coordinate system of the embodiment of FIG. 1, or the track-oriented coordinate system of the embodiment of FIGS. 3A-3B. While the optical beam is focused at each position, a marking is optically written to the optical disc 100 (704).

When the optical beam is being moved to and focused at the number of positions on the optical disc 100, constant optical beam radial position accuracy and constant optical beam linear position accuracy are maintained. This means that all radially adjacent and radially linear positions on the optical disc 100 are separated from one another by a uniform distance, and that each position has a location on the optical disc 100 specifiable to the same degree of precision by at least one integral coordinate, as has been described. When the optical beam is moved to each position, the optical disc may be rotated at either a constant angular velocity (CAV), or a constant linear velocity (CLV), or at a combination of both, depending on the radial position of the beam and the control capabilities of the system.

In the context of the spiral-oriented coordinate system of the embodiment of FIG. 1, the optical beam may move to positions from the first position 106A to the last position 106N by moving the beam outward at a constant velocity as the optical disc 100 is rotated at a CAV. Alternatively, the optical beam may move to positions from the first position 106A to the position 106N by moving the beam outward at a velocity inversely proportional to its radial position on the optical disc 100 as the disc 100 is rotated at a CLV. In the context of the track-oriented coordinate system of the embodiment of FIGS. 3A-3B, the optical beam may move to all the positions on each track on the optical disc 100, starting from the first track denoted by the position 302A to the last track denoted by the position 302N, by moving the optical beam outward by the uniform distance at the end of each rotation of the disc 100. Furthermore, in either embodiment, the directions that have been indicated can be reversed, tracing the spiral track inward, or marking the concentric circular tracks starting at the outside diameter and moving inward towards the inside diameter. In addition, the spiral track can be constructed to spiral inward or outward in either a clockwise or a counterclockwise direction, and the concentric circular tracks can be marked either in a clockwise or a counter-clockwise direction.

Mass Storage Device

Figure 8:
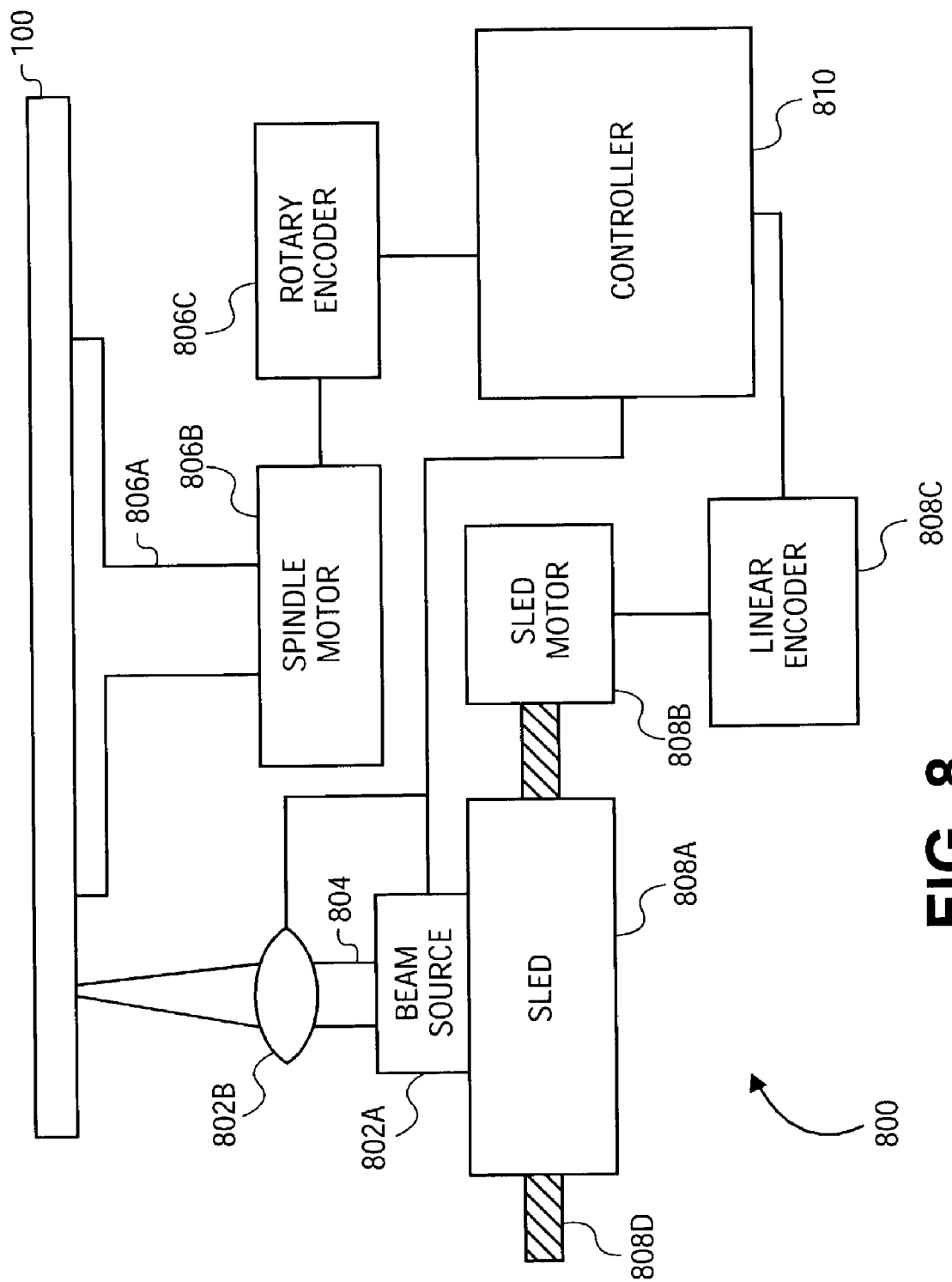
FIG. 8 is a diagram of a mass storage device, according to an embodiment of the invention.

FIG. 8 shows a mass storage device 800, according to an embodiment of the invention. The mass storage device 800 is for reading from and/or writing to the optical disc 100. More specifically, the mass storage device 800 is for reading from and/or writing to an optically writable data surface of the optical disc 100, and/or an optically writable label surface of the optical disc 100. The mass storage device 800 includes a beam source 802A and an objective lens 802B, which are collectively referred to as the optical mechanism 802. The storage device 800 also includes a spindle 806A, a spindle motor 806B, and a rotary encoder 806C, which are collectively referred to as the first motor mechanism 806. The device 800 includes a sled 808A, a sled motor 808B, a linear encoder 808C, and a rail 808D, which are collectively referred to as the second motor mechanism 808. Finally, the mass storage device 800 includes a controller 810.

The optical mechanism 802 focuses an optical beam 804 on the optical disc 100. Specifically, the beam source 802A generates the optical beam 804, which is focused through the objective lens 802B onto the optical disc 100. The first motor mechanism 806 rotates the optical disc 100. Specifically, the optical disc 100 is situated on the spindle 806A, which is rotated, or moved, by the spindle motor 806B to a given position specified by the rotary encoder 806C communicatively coupled to the spindle motor 806B. The rotary encoder 806C may include hardware, software, or a combination of hardware and software. The second motor mechanism 808 moves the optical mechanism 802 radially relative to the optical disc 100. Specifically, the optical mechanism 802 is situated on the sled 808A, which is moved on the rail 808D by the sled motor 808B to a given position specified by the linear encoder 808C communicatively coupled to the sled motor 808B. The linear encoder 808C may include hardware, software, or a combination of hardware and software.

The controller 810 selects positions on the optical disc 100 at which the optical beam 804 is to be focused for optically writing to and/or optically reading from such positions, by controlling the optical mechanism 802 as well as the first motor mechanism 806 and the second motor mechanism 808. The optical mechanism 802 is able to control the beam 804 generated by the beam source 802A, the focusing of the beam 804 through the objective lens 802B, the spindle motor 806B through the rotary encoder 806C, and the sled motor 808B through the linear encoder 808C. The positions selected by the controller 810 are in accordance with an optical disc coordinate system, such as the coordinate system of the embodiment of FIG. 1, the coordinate system of the embodiment of FIGS. 3A and 3B, or another coordinate system. Therefore, the description of the coordinate systems of embodiments of the invention in the previous section of the detailed description is applicable to the controller 810, as well as the mass storage device 800, of FIG. 8. The controller 810 may include hardware, software, or a combination of hardware and software.

As can be appreciated by those of ordinary skill within the art, the components depicted in the mass storage device 800 are representative of one embodiment of the invention, and do not limit all embodiments of the invention. Other control approaches can also be employed. As only one example, the sled 808A may be positioned with the sled motor 808B, with finer adjustment obtained using a voice coil attached to the beam source 802A and/or the objective lens 802B.

Figure 9:
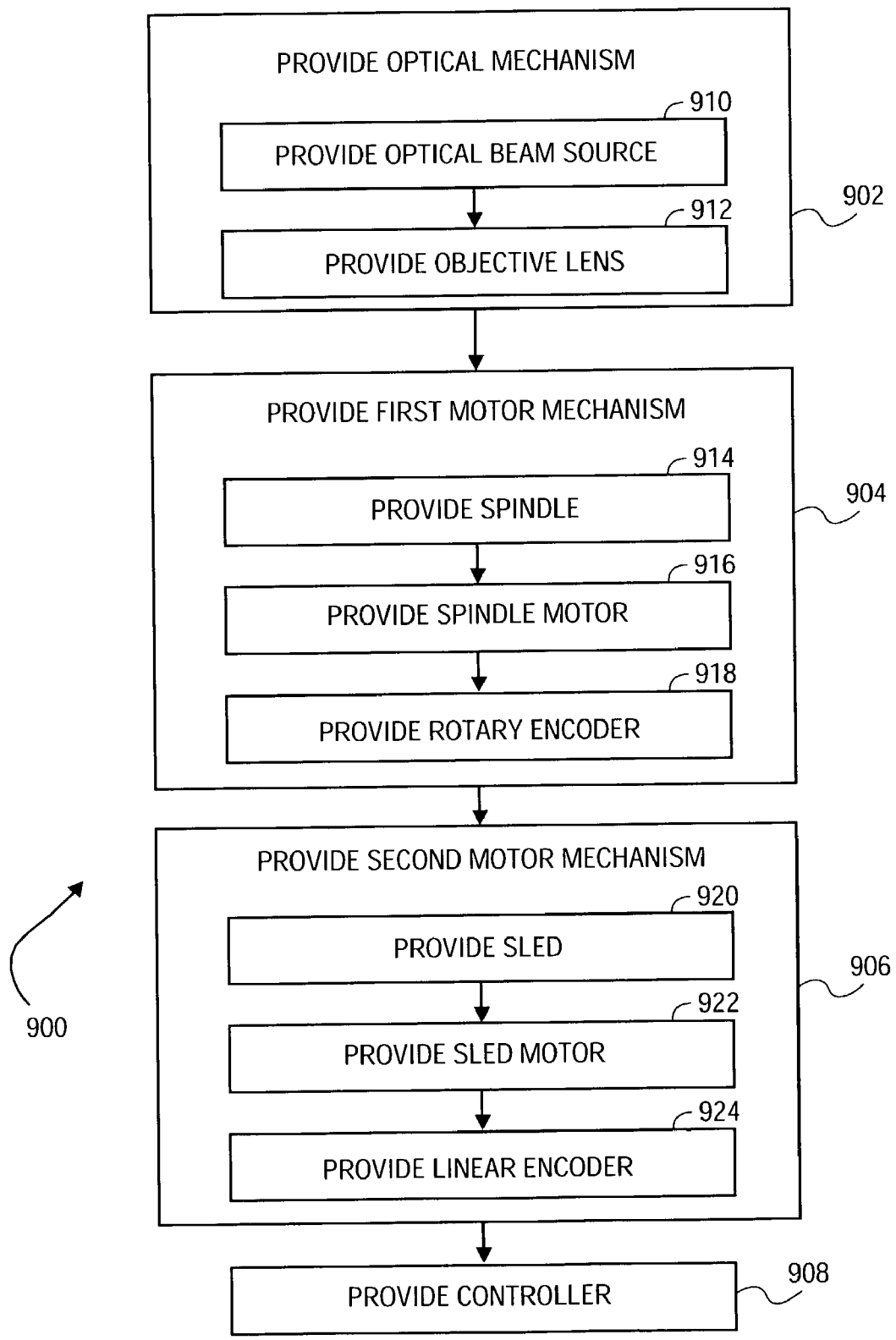
FIG. 9 is a flowchart of a method for manufacturing the mass storage device of FIG. 8, according to an embodiment of the invention.

FIG. 9 shows a method of manufacture 900 for the mass storage device 800 of FIG. 8, according to an embodiment of the invention. The method 900 includes providing the optical mechanism 802 (902), providing the first motor mechanism 806 (904), providing the second motor mechanism 808 (906), and providing the controller 810 (908). In one embodiment, providing the optical mechanism 802 includes providing the optical beam source 802A (910) and the objective lens 802B (912), whereas providing the first motor mechanism 806 in one embodiment includes providing the spindle 806A (914), the spindle motor 806B (916), and the rotary encoder 806C (918). Finally, providing the second motor mechanism 808 in one embodiment includes providing the sled 808A (920), the sled motor 808B (922), and the linear encoder 808C (924).

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. For example, whereas one embodiment of the invention employs a single uniform distance that separates adjacent positions along a spiral path or along the same track, as well as adjacent radial positions, another embodiment employs two or more uniform distances. A first uniform distance may separate adjacent positions along a spiral path or along the same track, and a second uniform distance may separate adjacent radial positions. Therefore, it is manifestly intended that this invention be limited only by the claims and equivalents thereof.

I claim:

1. A method for generating a non-Cartesian coordinate system for an optical disc comprising:
selecting a plurality of positions on the optical disc;
where the plurality of positions are selected on the optical disc as a spiral path, each position has a location on the optical disc that is specifiable to a same degree of precision by a single non-polar integral coordinate such that each position is separated from an adjacent prior position within the spiral path and an adjacent successive position within the spiral path by a first uniform distance; and,
where the plurality of positions are selected on the optical disc so that the plurality of positions are organized over a plurality of concentric tracks, each position within each track has a location on the optical disc that is specifiable to a same degree of precision by two non-polar integral coordinates,
such that each position is separated from an adjacent prior position within a same track and an adjacent successive position within the same track by a same second uniform distance in that any two adjacent positions on one of the tracks are separated by the same second uniform distance as any two adjacent positions on any other of the tracks are separated, and
such that each position within each track is separated from an adjacent prior position on an adjacent prior track and from an adjacent successive position on an adjacent successive track by a same third uniform distance.

2. The method in claim 1, wherein the first, the second, and the third uniform distances are each equal to a diameter of a marking that an optical beam is able to write on the optical disc.

3. The method of claim 1, wherein the first, the second, and the third uniform distances are each less than a diameter of a marking that an optical beam is able to write on the optical disc.

4. The method of claim 1, wherein where the plurality of positions are selected on the optical disc as the spiral path, the spiral path is one of outward and inward from a first position on an inside diameter of the optical disc to a last position on an outside diameter of the optical disc in one of a clockwise and a counter-clockwise direction.

5. The method of claim 4, wherein where the plurality of positions are selected on the optical disc as the spiral path, each position is specifiable to the same degree of precision by the single non polar integral coordinate equal to a multiple of the first uniform distance by which the position is located on the spiral path away from the first position.

6. The method of claim 1, wherein where the plurality of positions are selected on the optical disc so that the plurality of positions are organized over the plurality of concentric tracks, each position of each track is specifiable to the same degree of precision by a first non-polar integral coordinate equal to a multiple of the third uniform distance by which the track is radially located away from one of the inside diameter and the outside diameter, and a second non-polar integral coordinate equal to a multiple of the second uniform distance by which the position is located on the track away from the initial position on the track in one of a clockwise and a counter-clockwise direction.

7. The method of claim 1, wherein where the plurality of positions are selected on the optical disc so that the plurality of positions are organized over the plurality of concentric tracks, each track starts at a first position thereof that is collinear with the first positions of the other tracks.

8. The method of claim 1, wherein where the plurality of positions are selected on the optical disc so that the plurality of positions are organized over the plurality of concentric tracks, each track starts at a first position thereof that is non-collinear with the first positions of the other tracks.

9. An optical disc having optically writable markings thereon formed according to a method comprising:
moving an optical beam to and focusing the optical beam at a plurality of positions on an optically writable label surface of the optical disc while maintaining constant optical beam radial position accuracy and constant optical beam linear position accuracy such that each position has a location on the optical disc specifiable to a same degree of precision by one to two non-polar integral coordinates; and,
while the optical beam is focused at each position of the number of positions, writing a marking at the position on the optically writable surface,
wherein the plurality of positions are selected on the optical disc as a spiral path or so that the plurality of positions are organized over a plurality of concentric tracks,
where the plurality of positions are selected on the optical disc as the spiral path, each position has a location on the optical disc that is specifiable to the same degree of precision by a single non-polar integral coordinate such that each position is separated from an adjacent prior position within the spiral path and an adjacent successive position within the spiral path by a first uniform distance; and, where the plurality of positions are selected on the optical disc so that the plurality of positions are organized over a plurality of concentric tracks, has a location on the optical disc that is specifiable to the same degree of precision by two non-polar integral coordinates, such that each position is separated from an adjacent prior position within a same track and an adjacent successive position within the same track by a same second uniform distance in that any two adjacent positions on one of the tracks are separated by the same second uniform distance as any two adjacent positions on any other of the tracks are separated, and such that each position within each track is separated from an adjacent prior position on an adjacent prior track and from an adjacent successive position on an adjacent successive track by a same third uniform distance.

10. The optical disc of claim 9, wherein moving the optical beam to each position of the number of positions comprises rotating the optical disc at one of constant angular velocity (CAV), a constant linear velocity (CLV), and a combination of CAV and CLV.

11. The optical disc of claim 9, wherein where the plurality of positions are selected on the optical disc as the spiral path, the spiral path is one of outward and inward from a first position on one of an inside diameter and an outside diameter of the optical disc to a last position on the other of the inside diameter and the outside diameter of the optical disc, and each position is specifiable to the same degree of precision by the non-polar integral coordinate equal to a multiple of a uniform distance by which the position is located on the spiral path away from the first position in one of a clockwise and a counter-clockwise direction.

12. The optical disc of claim 11, wherein the plurality of positions are selected on the optical disc as the spiral path by moving the optical beam one of outward and inward at a constant velocity as the optical disc is rotated at constant angular velocity (CAV).

13. The optical disc of claim 11, wherein the plurality of positions are selected on the optical disc as the spiral path by moving the optical beam one of outward and inward at a velocity inversely proportional to a radial position of the optical beam on the optical disc as the optical disc is rotated at constant linear velocity (CLV).

14. The optical disc of claim 9, wherein where the plurality of positions are selected on the optical disc so that the plurality of positions are organized over the plurality of concentric tracks, each position of each track is specifiable to the same degree of precision by the first non-polar integral coordinate equal to a multiple of the third uniform distance by which the track is radially located away from the inside diameter and the second non-polar integral coordinate equal to a multiple of the second uniform distance by which the position is located on the track away from the initial position on the track.

15. The optical disc of claim 14, wherein the plurality of positions are selected on the optical disc so that the plurality of positions are organized over the plurality of concentric tracks by moving the optical beam one of outward and inward by the uniform distance at an end of each of a plurality of rotations of the optical disc.

16. A mass storage device comprising:
an optical mechanism to focus an optical beam onto an optical disc;
a first motor mechanism to rotate the optical disc;
a second motor mechanism to move the optical mechanism radially relative to the optical disc; and,
a controller to select from a plurality of positions on the optical disc adjacently separated by one or more uniform distances and having locations specifiable to a same degree of precision by one to two integral coordinates at which to optically write to the optical disc by controlling the optical and first and second motor mechanisms, wherein where the plurality of positions are selected on the optical disc as a spiral path, each position has a location on the optical disc that is specifiable to a same degree of precision by a single non-polar integral coordinate such that each position is separated from an adjacent prior position within the spiral path and an adjacent successive position within the spiral path by a first uniform distance; and, wherein where the plurality of positions are selected on the optical disc so that the plurality of positions are organized over a plurality of concentric tracks, each position within each track has a location on the optical disc that is specifiable to a same degree of precision by two non-polar integral coordinates, such that each position is separated from an adjacent prior position within a same track and an adjacent successive position within the same track by a same second uniform distance in that any two adjacent positions on one of the tracks are separated by the same second uniform distance as any two adjacent positions on any other of the tracks are separated, and such that each position within each track is separated from an adjacent prior position on an adjacent prior track and from an adjacent successive position on an adjacent successive track by a same third uniform distance.

17. The mass storage device of claim 16, wherein where the plurality of positions on the optical disc are selected as the spiral path, the spiral path is one of outward and inward from a first position on one of an inside diameter and an outside diameter of the optical disc to a last position on the other of the inside diameter and the outside diameter of the optical disc, each position specifiable to the same degree of precision by the non-polar integral coordinate equal to a multiple of the first uniform distance by which the position is located on the spiral path away from the first position in one of a clockwise and a counter-clockwise direction.

18. The mass storage device of claim 16, wherein where the plurality of positions on the optical disc are organized so that the plurality of positions are organized over the plurality of concentric tracks each track is separated from adjacent tracks by the third uniform distance and has a number of the plurality of positions including a first position, each position of each track specifiable to the same degree of precision by a first non-polar integral coordinate equal to a multiple of the third uniform distance by which the track is radially located away from one of the inside diameter and the outside diameter, and by a second integral coordinate equal to a multiple of the second uniform distance by which the position is located on the track away from the initial position on the track.

19. The mass storage device of claim 16, wherein the first, the second, and the third uniform distances are each equal to a diameter of a marking that the optical beam is able to write on the optical disc.

20. The mass storage device of claim 16, wherein the first, the second, and the third uniform distances are each less than a diameter of a marking that the optical beam is able to write on the optical disc.

21. The mass storage device of claim 16, wherein the optical disc has an optically writable label surface incident to the optical beam.

22. The mass storage device of claim 16, wherein the optical disc has an optically writable data surface incident to the optical beam.

23. A mass storage device comprising:
means for focusing an optical beam onto an optical disc;
means for rotating the optical disc to a position thereon;
means for moving the optical beam radially relative to the optical disc to a position thereon; and,
means for optically writing to a number of positions on the optical disc selected from a plurality of positions adjacently separated by a uniform distance and having locations specifiable to a same degree of precision by at least one integral non-rectangular coordinate,
wherein each of the plurality of positions on the optical disc is specifiable by one or more, non-polar integral coordinates,
where the plurality of positions are selected on the optical disc as a spiral path, each position has a location on the optical disc that is specifiable to a same degree of precision by a single non-polar integral coordinate such that each position is separated from an adjacent prior position within the spiral path and an adjacent successive position within the spiral path by a first uniform distance; and,
where the plurality of positions are selected on the optical disc so that the plurality of positions are organized over a plurality of concentric tracks, each position within each track has a location on the optical disc that is specifiable to a same degree of precision by two non-polar integral coordinates,
such that each position is separated from an adjacent prior position within a same track and an adjacent successive position within the same track by a same second uniform distance in that any two adjacent positions on one of the tracks are separated by the same second uniform distance as any two adjacent positions on any other of the tracks are separated, and
such that each position within each track is separated from an adjacent prior position on an adjacent prior track and from an adjacent successive position on an adjacent successive track by a same third uniform distance.

24. The mass storage device of claim 23, wherein the first, the second, and the third uniform distances are each equal to a diameter of a marking that the optical beam is able to write on the optical disc.

25. The mass storage device of claim 23, wherein the first, the second, and the third uniform distances are each less than a diameter of a marking that the optical beam is able to write on the optical disc.

26. A method for manufacturing a mass storage device comprising:
providing an optical mechanism that is able to focus an optical beam onto an optical disc;
providing a plurality of motor mechanisms that is able to rotate the optical disc to a position and to move the optical mechanism radially relative to the optical disc to a position; and,
providing a controller that is able to select a number of positions on the optical disc while maintaining constant optical beam radial position accuracy and constant optical beam linear position accuracy such that each position has a location on the optical disc specifiable to a same degree of precision by one to two integral coordinates at which to optically write to the optical disc by controlling the optical and the motor mechanisms,
wherein each of the positions on the optical disc is specifiable by one or more, non-polar integral coordinates,
where the plurality of positions are selected on the optical disc as a spiral path, each position has a location on the optical disc that is specifiable to a same degree of precision by a single non-polar integral coordinate such that each position is separated from an adjacent prior position within the spiral path and an adjacent successive position within the spiral path by a first uniform distance; and,
where the plurality of positions are selected on the optical disc so that the plurality of positions are organized over a plurality of concentric tracks, each position within each track has a location on the optical disc that is specifiable to a same degree of precision by two non-polar integral coordinates,
such that each position is separated from an adjacent prior position within a same track and an adjacent successive position within the same track by a same second uniform distance in that any two adjacent positions on one of the tracks are separated by the same second uniform distance as any two adjacent positions on any other of the tracks are separated, and
such that each position within each track is separated from an adjacent prior position on an adjacent prior track and from an adjacent successive position on an adjacent successive track by a same third uniform distance.

27. An optical disc comprising:
an optically writable label surface; and,
a plurality of markings at a corresponding number of positions on the optically writable label surface,
the number of positions selected from a plurality of positions, each position separated from adjacent positions by one or more uniform distances and having a location on the optical disc specifiable to a same degree of precision by at least one non-rectangular integral coordinate,
wherein each of the plurality of positions on the optical disc is specifiable by one or more, non-polar integral coordinates,
where the plurality of positions are selected on the optical disc as a spiral path, each position has a location on the optical disc that is specifiable to a same degree of precision by a single non-polar integral coordinate such that each position is separated from an adjacent prior position within the spiral path and an adjacent successive position within the spiral path by a first uniform distance; and,
where the plurality of positions are selected on the optical disc so that the plurality of positions are organized over a plurality of concentric tracks, each position within each track has a location on the optical disc that is specifiable to a same degree of precision by two non-polar integral coordinates, such that each position is separated from an adjacent prior position within a same track and an adjacent successive position within the same track by a same second uniform distance in that any two adjacent positions on one of the tracks are separated by the same second uniform distance as any two adjacent positions on any other of the tracks are separated, and such that each position within each track is separated from an adjacent prior position on an adjacent prior track and from an adjacent successive position on an adjacent successive track by a same third uniform distance.

28. The optical disc of claim 27, wherein the first, the second, and the third uniform distances are each equal to a diameter of each marking.

29. The optical disc of claim 27, wherein the first, the second, and the third uniform distances are each less than a diameter of each marking.

30. The optical disc of claim 27, wherein where the plurality of positions are selected on the optical disc as the spiral path, the spiral path is one of outward and inward from a first position on one of an inside diameter and an outside diameter of the optical disc to a last position on the other of the inside diameter and the outside diameter of the optical disc, such that each position is specifiable to the same degree of precision by the non-polar integral coordinate equal to a multiple of the first uniform distance by which the position is located on the spiral path away from the first position in one of a clockwise and a counter-clockwise direction.

31. The optical disc of claim 27, wherein where the plurality of positions are selected on the optical disc so that the plurality of positions are organized over the plurality of concentric tracks, each track is separated from adjacent tracks by the third uniform distance and has a number of the positions including a first position, such that each position of each track is specifiable to the same degree of precision by a first non-polar integral coordinate equal to a multiple of the third uniform distance by which the track is radially located away from the inside diameter and a second non-polar integral coordinate equal to a multiple of the second uniform distance by which the position is located on the track away from the initial position on the track.

* * * * *

UNITED STATES PATENT AND TRADEMARK OFFICE
CERTIFICATE OF CORRECTION

PATENT NO. : 7,307,649 B2 Page 1 of 1
APPLICATION NO. : 10/317894
DATED : December 11, 2007
INVENTOR(S) : Paul J. McClellan It is certified that error appears in the above-identified patent and that said Letters Patent is hereby corrected as shown below:

In column 10, line 1, in Claim 2, delete "in" and insert -- of --, therefor.

In column 10, line 18, in Claim 5, delete "non polar" and insert -- non-polar --, therefor.

In column 12, line 53, in Claim 18, after "concentric tracks" insert -- , --.

Signed and Sealed this

Fifth Day of August, 2008

JON W. DUDAS
*Director of the United States Patent and Trademark Office*